Jan. 1, 1929.　　　　　　　　　　　　　　　　　　　1,697,454
O. B. BROWN ET AL
DRIER
Filed July 16, 1925　　　　5 Sheets-Sheet 1
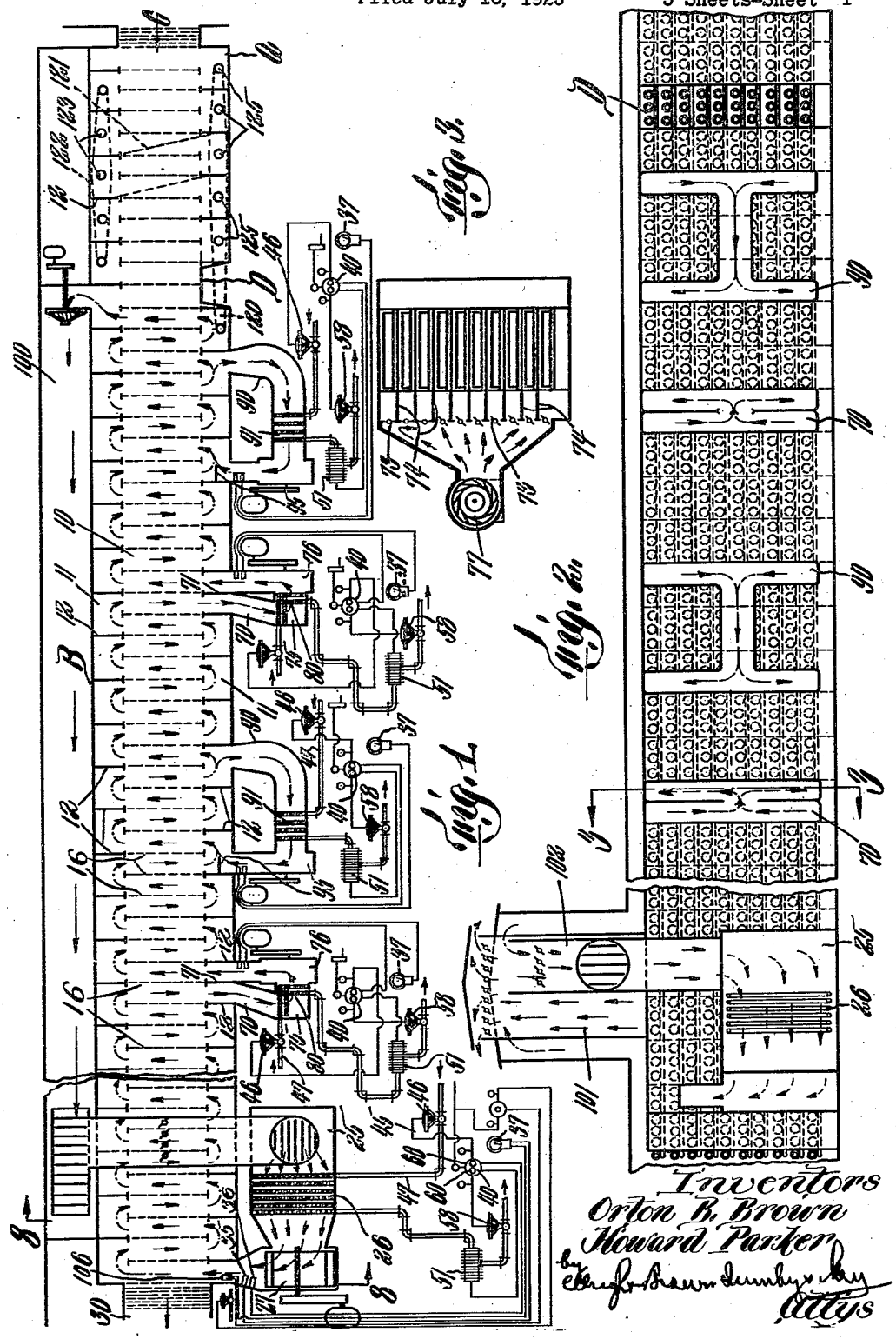

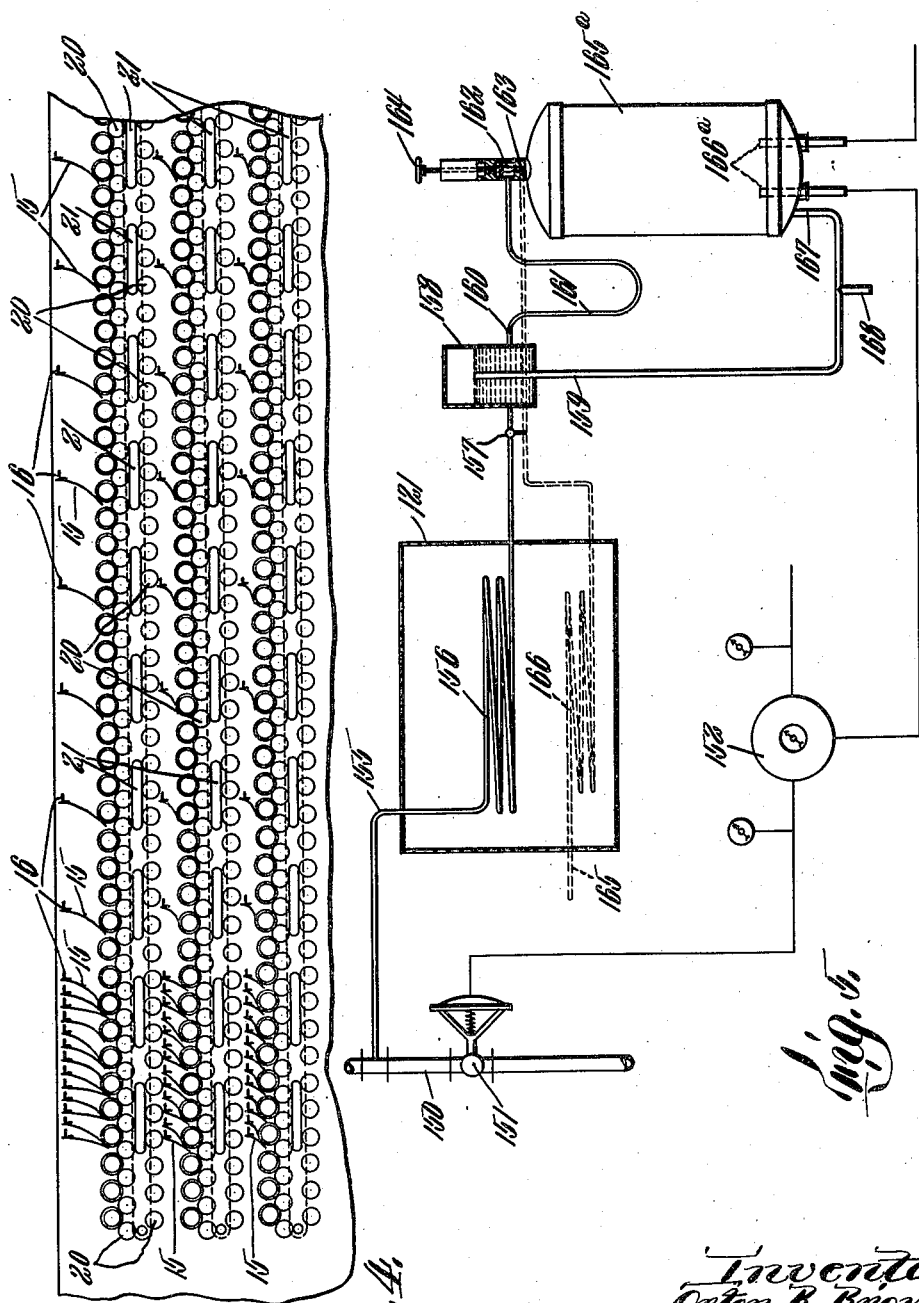

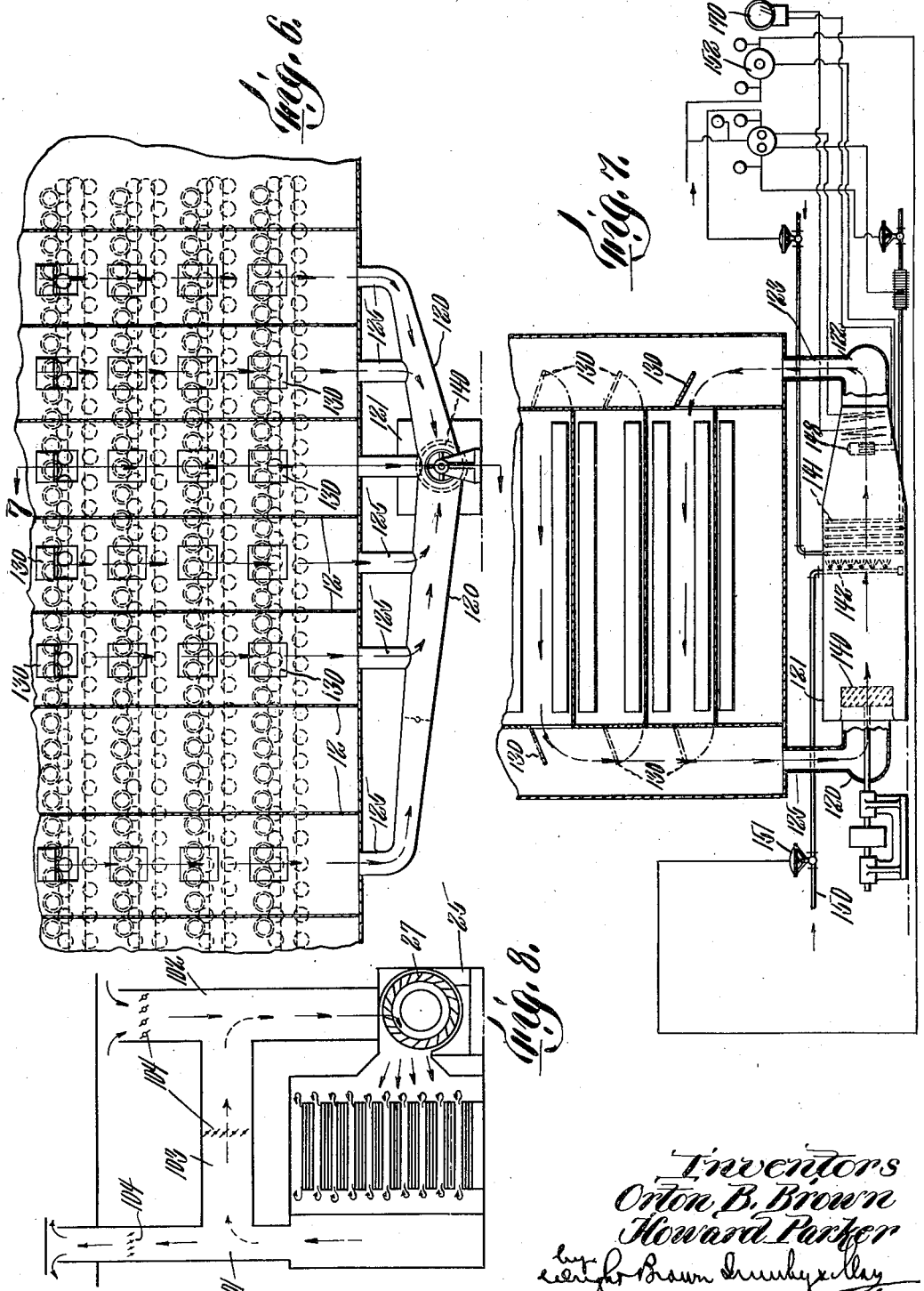

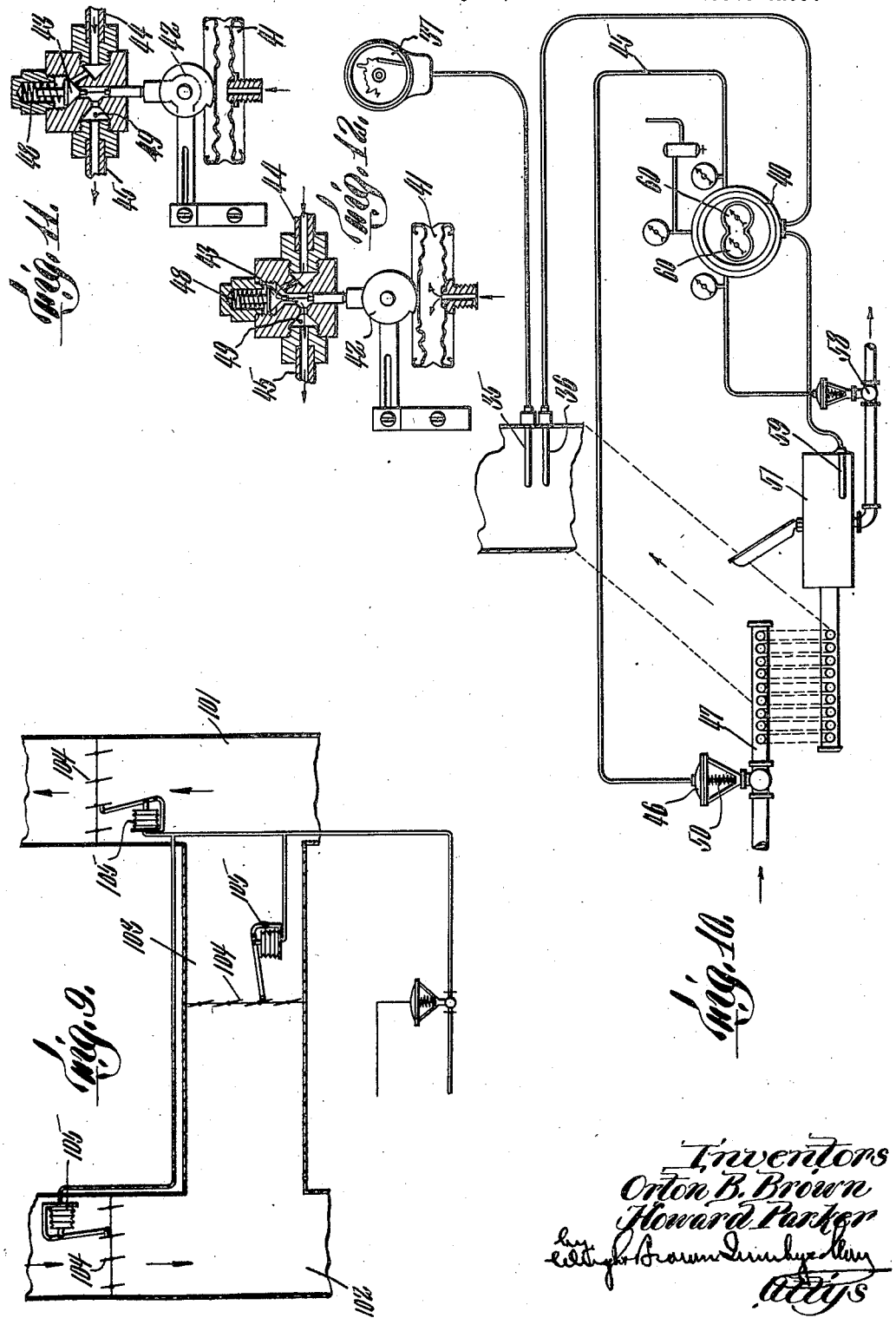

Jan. 1, 1929.
O. B. BROWN ET AL
1,697,454
DRIER
Filed July 16, 1925    5 Sheets-Sheet 5
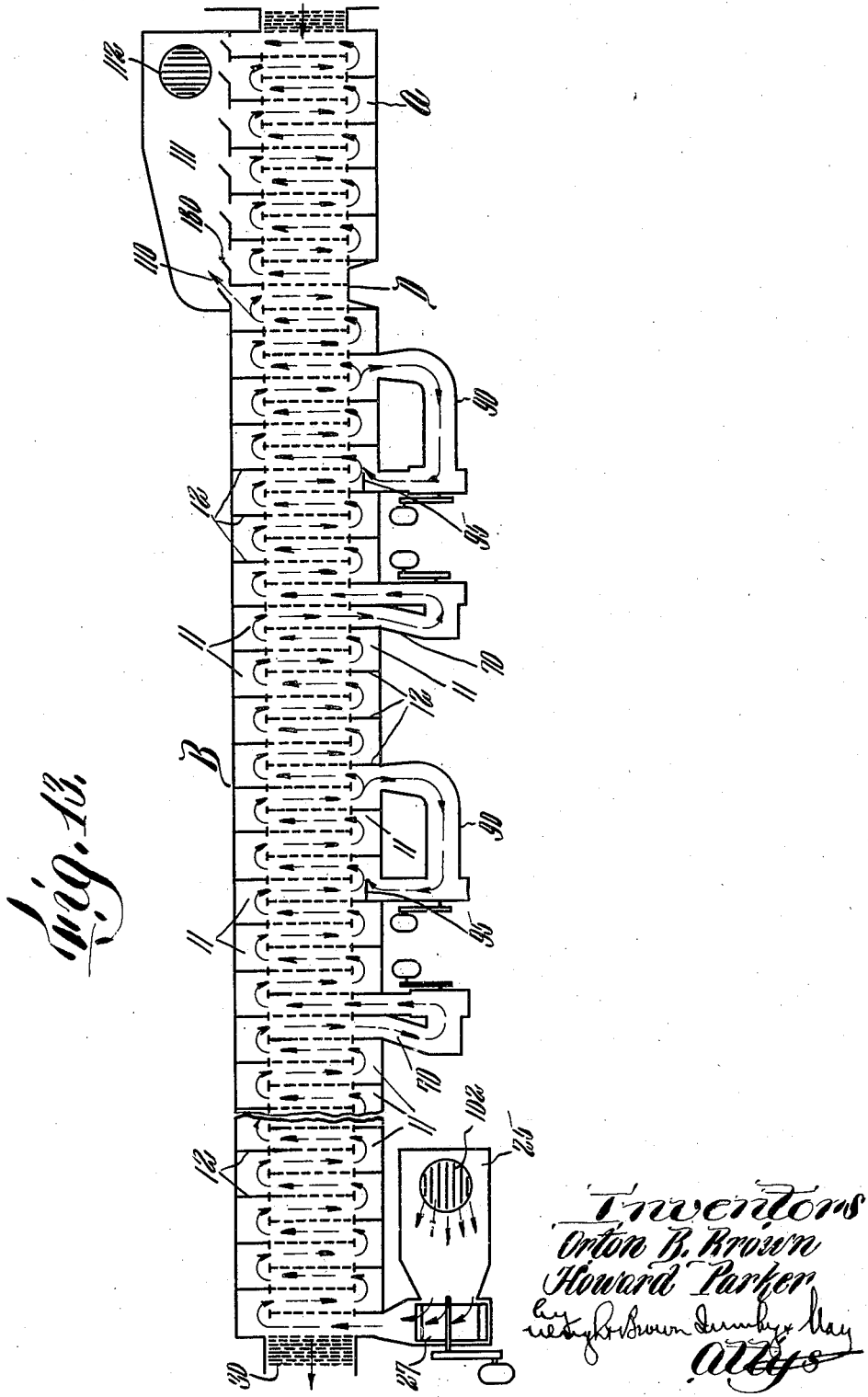

Patented Jan. 1, 1929.

1,697,454

UNITED STATES PATENT OFFICE.

ORTON B. BROWN AND HOWARD PARKER, OF BERLIN, NEW HAMPSHIRE, ASSIGNORS TO BROWN COMPANY, OF BERLIN, NEW HAMPSHIRE, A CORPORATION OF MAINE.

DRIER.

Application filed July 16, 1925. Serial No. 43,928.

This invention relates to driers intended more particularly for drying tubes made of cellulosic fiber felted on a paper machine and wound into tubular form, though it should be understood that certain features of the invention might be found applicable with advantage to the drying of other articles or materials.

More particularly this invention relates to a drier of the type disclosed and claimed in the application for patent of Howard Parker, Serial No. 622,610, filed March 3, 1921, for method and apparatus for handling and drying pulp tubes or the like.
The tubes are wound on mandrels when being formed and in order to remove these mandrels the tubes with the mandrels therein are subjected to the action of moist hot air which causes the tubes to expand and free the mandrels, whereupon they may be readily removed.

According to this invention moist air for this purpose is taken from that portion of the drier where the drying is begun since the air is there the most humid and this air is heated to the desired degree and such further moisture added as may be found desirable. The amount of moisture added as well as the temperature to which the moist air is raised may be controlled automatically. After the mandrels have been removed the tubes are passed into and through the drying chamber, heated air being caused to pass lengthwise around and through the tubes and to progress through the drying chamber in a general direction opposite to that of the progress of the tubes. As disclosed in the application for patent hereinbefore referred to the tubes are transported in superposed tiers through the drying chamber. In order, therefore, to effect substantially uniform and equal drying of the tubes of the several tiers, means are provided for preventing the warmer air from rising to and remaining in the upper portion of the chamber so as to contact with the tubes of the upper tiers, the colder air contacting with the tubes in the lower tiers.

According to this invention, therefore, means are provided for withdrawing air at positions spaced lengthwise of the chamber at any desired level and for reintroducing this air at any desired level which may be different from that at which the air was removed. For the purpose of aiding in the general progression of the air lengthwise of the chamber, this air is returned further advanced than the withdrawal position in the direction of progress of the air through the drying chamber, these means therefore acting as "boosters." The air may be heated in the booster.

A very considerable amount of water must be removed from the tubes in the drying operation, and consequently the hot air originally supplied to the drier soon becomes cooled and so nearly saturated with moisture that it is relatively inefficient in removing further moisture. A further feature of this invention therefore resides in the application of "circulators" by which the moisture laden air is taken from the drying chamber at suitable positions lengthwise thereof, is reheated and returned to the drying chamber, preferably in positions back of the withdrawal positions in the direction of progress of the air lengthwise of the drier chamber, where it first contacts with somewhat drier tubes than those at the withdrawal positions but which are sufficiently wet to be treated with advantage by the reheated air. The temperature to which the air is heated by the boosters and circulators is preferably automatically controlled.

Further features of the invention will appear from a more complete description of certain embodiments thereof shown in the accompanying drawings in which—

Figure 1 is a somewhat diagrammatic plan illustrating one form of drier.

Figure 2 is a diagrammatic side elevation of the same.

Figure 3 is a diagrammatic sectional view on line 3—3 of Figure 2.

Figure 4 is a fragmentary sectional view illustrating certain of the baffles for directing the flow of air about the tubes.

Figure 5 is a diagrammatic view illustrating a humidity control for the air supplied to the sweating chamber.

Figure 6 is a fragmentary vertical section at the sweating chamber end of the drier showing the manner of humidifying the air.

Figure 7 is a section on line 7—7 of Figure 6.

Figure 8 is a diagrammatic section on line 8—8 of Figure 1.

Figure 9 is a diagrammatic view showing an automatic damper control.

Figure 10 is a diagrammatic view of a temperature regulating mechanism.

Figures 11 and 12 are detail sections of a pressure control valve to the temperature regulating mechanism showing parts in different positions.

Figure 13 is a view somewhat similar to Figure 1, but showing a modified construction of drier.

Referring first to Figures 1 to 3, it will be seen that the drier comprises two longitudinally alined chambers A and B. The chamber A comprises the sweating chamber in which the tubes as formed on the mandrels are initially placed and in which they are rotated while subjected to moist heat in order to swell the tubes and free the mandrels therefrom. These tubes, containing approximately 80% of water, are passed through the sweating chamber in the direction of the arrow C toward the drying chamber B, and at a point intermediate these chambers, as shown at D, doors may be opened to render the ends of the tubes accessible so that the mandrels may be removed therefrom before their passage into the drying chamber B in which they are dried. When the tubes are removed from the end of the drying chamber remote from the sweating chamber the drying has been completed to the desired degree of from 1% to 20% of water.

Both the sweating chamber and the drying chamber are provided with means for insuring the passage of the air lengthwise of the tubes which are moved sidewise through these chambers, the air thus progressing in a zigzag path from one end to the other of each of these chambers. For this purpose each of these chambers is shown as comprising a central lengthwise zone 10 of a width sufficient to permit the tubes to be passed laterally therethrough, there being on opposide sides of this zone lateral zones 11 each provided with partitions 12 extending inwardly from their outer walls to their central zone 10. It will be noted that the partitions 12 are staggered in the opposite zones 11 so as to produce pockets overlapping lengthwise of the chambers, each of these pockets being formed so as to reverse the direction of passage of the air entering therein through that portion nearest the exit end of the drier for the tubes, and leaving in that portion nearest the entrance end for the tubes and being passed from one of these pockets across the central zone 10 into the pocket of the opposite zone 11 which thereupon causes a reverse direction of motion of the air to take place, directing it across the zone 10 and into the entrance portion of the pocket on the opposite side next adjacent toward the tube entrance from that previously joined through on the same side.

The air is prevented from moving freely lengthwise of the central zone 10 by means of flexible baffles such as are shown best in Figure 4 at 15 which are hung from cross members 16 in the chambers and whose lower edges are contacted by the tubes as they progress through the chambers. These tubes, as shown in this figure, are arranged in superposed tiers, being carried by superposed series of supporting rollers 20 arranged in endless succession passing through the chambers in the direction of progress of the tubes at their upper stretches and returning in the opposite direction therebeneath. Stationary baffles 21 of any suitable description may be placed between the upper and lower stretches of the series of rollers 20 to prevent free passage of the air between these stretches. At the ends of the chambers the baffles 15 may be arranged close together so as to more effectually seal off the openings through which the tubes are inserted and removed from the escape or entrance of air thereto. Within the chambers fewer of these baffles are necessary in order to properly direct the air.

As shown best in Figures 1 and 8, the air to be introduced into the drying chamber B is drawn through an intake box 25 and over steam heating coils 26 by means of a fan 27 and introduced into the drying chamber B adjacent to the exit end 30 for the tubes. In order that the coils 26 may heat the air to the desired temperature automatic temperature regulating means are shown such means being illustrated somewhat in detail in Figures 10, 11 and 12. Between the fan 27 and the air entrance to the drying chamber B are positioned two temperature responsive bulb elements 35 and 36. One of these elements, as 35, communicates with a temperature recorder 37. The other element 36 communicates with the temperature regulator at 40 where it leads to a capsular chamber 41 shown in section in Figures 11 and 12. Variations in temperature of the bulb 36 act to expand or contract the capsular chamber 41 and through an adjustable cam 42 to open or permit closing of a valve 43 controlling the supply of compressed air from a pipe 44 to a pipe 45 leading to a diaphragm valve at 46 in the steam supply line 47. When the valve 43 is opened by expansion of the chamber 41 air passes by the valve 43 and through the pipe 45 to the diaphragm valve and acts to close off this valve so that supply of steam to the coils is shut off. This expansion of the capsular chamber takes place on rise of temperature of the bulb 36 to the desired point as regulated by adjustment of the cam 42. When the temperature of the air falls below the desired point, the bulb 36 cools, permitting the capsular chamber 41 to collapse somewhat and permitting the valve 43 to be seated by reason of the spring 48 which acts thereon.

The supply of compressed air to the diaphragm valve is therefore cut off and the air acting on the valve leaks off through a small bleeder port 49 adjacent to the valve 43, permitting the diaphragm valve to open under the action of its spring 50, and permitting the steam to again enter the heating coil.

As it is desired to utilize the heat to the best advantage, provision is made for holding the steam in the coils so long as its temperature is sufficiently high to heat the air passing therethrough to the desired degree and when this supply of steam in the coils has cooled to a point insufficient for this purpose, this cooled steam and any condensate therein is then exhausted, permitting a fresh supply of steam to flow into the coil. For this reason the coils are not connected freely to the exhaust, but pass to a condenser 51 having a diaphragm valved outlet 58 which is normally open. A temperature responsive bulb 59 is placed within this condenser and through a valve mechanism similar to that disclosed in Figures 11 and 12 controls the opening and closing of this diaphragm valve 58 so that when the bulb 59 is at sufficiently high temperature so that air passing through the coils may be heated to the desired degree the valve 58 is held closed, but that whenever the temperature of the bulb 59 becomes lowered to such a point that the air will not be sufficiently heated, the valve 58 is allowed to open to permit the steam and condensate to exhaust from the coils. The two control valves, one controlling the steam supply and the other the steam exhaust, may be mounted in a common casing as at 40 and the cams 42 may be accessible for control at the forward face thereof and have indicators as at 60 showing the temperature at which the air and the exhaust steam are to be maintained by the corresponding settings of the cams.

As the air passes back and forth in a zigzag course from the air entrance toward the sweating chamber A it takes up moisture from the tubes and becomes cooled thereby. Its velocity is somewhat slowed by the resistance to its passage imparted by the walls of the chamber, the baffles and the tubes. There is also a tendency for the warm air to rise to the top of the chamber and the cooler air to fall to the bottom thereof so that there is the tendency of the tubes in the upper tiers to be more completely dried than those in the lower tiers. In order to prevent such unequal drying of the tubes and also to aid in the circulation of the air "boosters" may be provided at suitable intervals along the length of the drying chamber B so designed as to give an added impulse to the passage of the air in its normal direction of passage through the drier, and these boosters may be so formed as to take the air from one or more levels of the chamber and return it at a different level or levels therein. These boosters are indicated at 70 where the outer side wall of the chamber at one of the pockets between adjacent partitions 12 is removed and a central partition 71 dividing this vertically is introduced. The portions between this central partition 71 and the adjacent partitions 12 are provided with series of dampers 73, one damper at the level of each tier of tubes, these dampers being independently actuable to open or close communication with these levels. Between these dampers may be positioned horizontal partitions 74 extending between the tiers. In communication with each of the vertical series of dampers 73 are the passages 75 and 76 between which is positioned a centrifugal fan 77 which acts to take the air from the passage 75 nearest to the air entrance end of the chamber B and to force it into the passage 76 where it enters through such of the dampers 73 as may be opened in this passage 76 into the chamber ahead of the partition 71 in the direction of progress of the air lengthwise of the drying chamber. Thus, this fan acts to give an added impulse to the passage of the air in its normal direction of passage, zigzaging across the drying chamber, and by opening the upper dampers in the passage 75 and the lower dampers in the passage 76 the air is taken from the upper portion of the drying chamber toward its air entrance end and is forced into the lower portion of the chamber in advance thereof in its direction of progress which thus takes the warmer air which has arisen to the top of the drying chamber and reintroduces it into the lower portions of the chamber. By manipulation of the dampers 73 in the passages 75 and 76 any desired distribution of the air vertically within the drying chamber may be produced. If desired also the air may be heated as well as boosted. For this purpose coils 80 have been shown in the passages 75 or 76 through which steam may be passed the steam supply and exhaust therefrom being regulated if desired by double control means such as have been hereinbefore described in connection with the supply of air to the main heating coils 26. As shown two of these booster mechanisms have been provided at different positions lengthwise of the drier chamber B, though of course more could be used if desired.

As there is a considerable quantity of moisture to be removed from the tubes and such removal effects a lowering of the temperature of the air, thus increasing its humidity and lessening its drying capacity, it has been found desirable to reheat the air at intervals to a greater extent than could be done in the boosters. As shown this is accomplished by devices shown at 90. A passage leads off from the forward portion of one of the pockets formed between adjacent partitions 12 at one side of the drier chamber and leads backwardly in the direction of motion of the air lengthwise through the drier chamber where it enters another pocket between partitions 12 spaced from the entrance pocket. This passage 90 may be provided with a series of dampers vertically arranged in its entrance and exit portions similar to that described in connection with the booster devices, but it will be noted that the air instead of being passed in the general direction of progress of the air lengthwise of the drier is passed in the reverse direction in these heating devices and in its passage is heated by means of the steam coils 91 to such a degree that the air passing therethrough is in condition to take moisture from tubes somewhat drier than those positioned at the air entrance portion of these heaters. Consequently the most efficient drying action is produced by passing this reheated air into the drying chamber nearer to the exit end for the tubes. In order, however, that such reverse flow may not impede the progress of the air through the drier, the air is taken from the forward portion of one of the pockets and introduced at the rearward portion of the other pocket where it encounters a baffle 95 which acts to deflect it forwardly in a direction to aid in the forcing of the air through its normal zigzag course through the drier. The steam supply and exhaust for the coils 91 may be controlled automatically by thermostatic devices such as have hereinbefore been described in connection with the steam coils 26. Two of these reheater devices 90 have been illustrated, alternating in position with the boosters 70, though of course more or less might be employed as occasion might seem to warrant.

In some cases it may be found desirable to regulate the humidity of the air entering the drying chamber. Where this is found desirable air after passing through the drying chamber may be returned lengthwise of this chamber through a passage 100 to a stack 101 situated on the opposite side of the drier chamber from the intake stack 102 leading to the box 25. The stacks 101 and 102 are shown as connected by a transverse passage 103 and in this passage as well as in the stacks 101 and 102 are positioned dampers 104 which are opened and closed automatically through suitable pneumatic control diaphragm devices 105. These devices may be actuated by a suitable humidity responsive element positioned at 106 in the air passage leading from the fan 27 into the drying chamber in such a manner that air may be taken through the stack 102 and through the passage 103 from the stack 101 in such proportions as may be determined by the controlling action of the humidostat. This construction is more fully described in the application for patent of Howard Parker hereinbefore mentioned.

In the device shown in Figure 13 there is no provision for taking air which has once passed through the drier and returning it thereto. Referring to this figure, it will be seen that the air passes into the drying chamber through the stack 102 and after passing through the drier chamber in zigzag course passes out as shown by the arrow at 110 to a chamber 111 communicating with the exhaust stack 112 which may have an exhaust fan therein if desired to further aid in the progression of the air through the drier. As shown in this figure there is also provided the booster mechanisms 70 and reheater mechanisms 90 similar to those illustrated in Figures 1 and 2.

As the air taken from the drier chamber contains considerable moisture it may be used to advantage in the sweating chamber in which the tubes are expanded so that the mandrels may be removed therefrom. For this reason, as shown in Figures 1 and 6, from near the last passage of the air through the drying chamber a pipe 120 leads to a transverse passage 121 beneath the sweating chamber to the opposite side thereof where it opens into a distributing pipe 122 communicating through the pipes 123 with the various pockets defined by the partitions 12 positioned along one side of the sweating chamber. The pipe 120 also communicates by vertical pipes 125 with the pockets along the same side of the sweating chamber as the pipe 120. These pockets on both sides of the sweating chamber may be provided with dampers as shown at 130 in Figure 7 which may be employed to control the passage of the moist air that is circulated about the tubes in this sweating section. While the air drawn into this sweating chamber from the drying chamber contains a considerable amount of moisture it may be insufficient to produce the desired degree of humidity in the sweating chamber, and it may also be necessary to heat the air in this sweating chamber. Within the passage 121, therefore, is positioned a circulating fan 140 which forces the air through steam heating coils 141 by which the air is heated, and adjacent to these steam heating coils is shown a spray pipe 142 formed with jets to direct the spray toward these heating pipes, this spray being employed to supply such additional moisture as may be required to produce the degree of humidity necessary to cause proper swelling of the tubes. The temperature to which the air is raised by means of the heating coil 141 may be regulated by temperature controlling mechanism acting to regulate the supply of steam to the supply coils and the exhaust of steam therefrom in a similar manner to that hereinbefore described with reference to the heating of the air by the coils 26, and the amount of moisture supplied through the spray pipe 142 may be also automatically regulated by the degree of humidity of this air.

As it is a difficult matter to insure a constant supply of water to a wet bulb thermometer in the passage 121 mechanism shown more in detail in Figure 5 has been found desirable in place of the wet bulb indicated conventionally in Figure 7 at 148. Referring to this figure, 150 indicates a water pipe leading to the spray pipe 142 and controlled by means of a diaphragm valve at 151 which is actuated by air pressure controlled by a temperature responsive device at 152 which may be of the same type illustrated in Figures 10, 11 and 12. The temperature, however, is that derived from a wet bulb thermometer which however is not positioned within the passage 121 as will appear. Leading from the water supply pipe 150 ahead of the control valve 151 is a small pipe 155 having a coil 156 therein positioned within the passage 121 beyond the coil 141 in the direction of progress of the air. This pipe leads through a control valve 157 by which its rate of flow may be regulated into a small tank 158 from which passes an overflow pipe 159 leading to waste. The upper end of this overflow pipe is positioned somewhat above an outlet pipe 160 for the water so as to provide a suitable small head of water which passes through the trap bend 161 of a spray nozzle 162. Air from a source of pressure passes through a pipe 165 and through a coil 166 also in the passage 121 to the atomizer 163 of the nozzle 162, the flow of air being regulated by a needle valve having a control handle at 164. By this means the water and the air are both raised to the temperature existing within the passage 121, beyond the coil 141, and the water is then vaporized by the air in the same manner as the water in the jacket of a wet bulb thermometer. The vapor thus produced passes downwardly within a container 165ª, which is preferably transparent, and contacts with the thermometers 166ª, which thus function as wet bulb thermometers, and the moisture condensing therefrom passes out from the overflow pipe 167 uniting with the overflow pipe 159 as at 168 and passes to waste. One of the wet bulbs 166ª, as is shown in Figure 7, leads to the wet bulb temperature recorder 170 and the other leads to the temperature regulator 152 and acts to control the supply of water to the spray. Since the temperature of the air as determined by a dry bulb thermometer is controlled by the supply of steam to the coil 121 and the exhaust of condensate therefrom and this is known, it only remains to adjust the web bulb regulator 152 to such a point below this temperature as will produce the required degree of humidity of the air as disclosed by the hygrodeik chart.

Similar control of the humidity may be used, if desired, in connection with the type of drier disclosed in Figure 13 in which instead of passing the air through the pipe 120, as shown in Figure 1, it is allowed to pass in a zigzag course similar to its passage through the drier chamber B through the sweating chamber, dampers being positioned at 180 leading from the pockets along one side of the chambers to the passage 111 by which the exhaust of air to the stack may be regulated as may be desired.

The rate of drying of the tubes is important, since if this be varied greatly from that at which best results are obtained, cracking or other damage to the tubes is likely to result. The temperatures as produced by the several heating devices and the humidities as indicated by the several humidostats are thus regulated according to the varying conditions of operation, such as the rate of feeding in of wet tubes, their sizes and character of pulp, and atmospheric conditions, so that the proper drying conditions are maintained. The time for drying tubes four or five inches in diameter and approximately ⅜ inch thick when dried is usually about 20 hours and the air temperature may range from about 225° F. in the sweat box to 210° F. at the tube discharge end.

Having thus described certain embodiments of this invention it should be evident to those skilled in the art that various changes and modifications may be made therein without departing from its spirit or scope as defined by the appended claims.

We claim:

1. An apparatus of the class described, comprising a chamber, means for transporting articles to be dried in one direction through said chamber, means for passing a drying agent through such chamber in the opposite direction, and means for removing and returning some of said agent from and to any selected of a plurality of different levels in said chamber.

2. An apparatus of the class described, comprising a chamber, means for transporting articles to be dried in one direction through said chamber, means for passing a drying agent through such chamber in the opposite direction, and means for removing some of said agent from any selected of a plurality of different levels in said chamber at one lengthwise position thereof and for returning said agent to said chamber at any selected of a plurality of levels at a different lengthwise position thereof.

3. An apparatus of the class described, comprising a chamber, means for transporting articles through said chamber in one direction, means for passing heated air through said chamber in the reverse direction, means for removing air from any selected of a plurality of levels in said chamber and returning the air to any selected of a plurality of levels in said chamber, and means for heating the air between such removal and return.

4. An apparatus of the class described, comprising a chamber, means for transporting articles through said chamber in one direction, means for passing heated air through said chamber in the reverse direction, means for removing air from any selected of a plurality of levels in said chamber at one lengthwise portion and returning the air to any selected of a plurality of levels in said chamber at a different lengthwise portion, and means for heating the air between such removal and return.

5. An apparatus of the class described, comprising a chamber, means for transporting articles through said chamber in one direction, means for passing heated air through said chamber in the reverse direction, means for removing air from any of a plurality of levels in said chamber at one lengthwise portion and returning the air to any of a plurality of levels in said chamber at another portion behind said one portion in the direction of travel of the air through said chamber, and means for heating the air between such removal and return.

6. An apparatus of the class described, comprising a chamber, means for transporting articles through said chamber in one direction, means for passing heated air through said chamber in the reverse direction, means for removing air from any of a plurality of levels in said chamber at one lengthwise portion, and returning the air to any of a plurality of levels in said chamber at another portion behind said one portion in the direction of travel of the air through said chamber, means for heating the air between such removal and return, and means for regulating the temperature to which such air is heated.

7. An apparatus of the class described, comprising a chamber, means for transporting articles in a plurality of superposed tiers through said chamber in one direction, means for passing heated air in the opposite direction through said chamber in contact with the articles, means for withdrawing air from said chamber at the level of any selected tier and for introducing air at the level of any selected tier, and means for heating the air between its withdrawal and its introduction.

8. An apparatus of the class described, comprising a chamber, means for transporting articles in one direction through said chamber, means for passing heated air in the opposite direction through said chamber, mechanism for removing air from a plurality of portions of said chamber and for returning it at portions spaced from said removal portions in one direction relative to the direction of progress of the air through said chamber, and mechanism for removing air from other portions of said chamber and returning it at portions spaced therefrom in an opposite direction relative to the direction of progress of the air through said chamber.

9. An apparatus of the class described, comprising a chamber, means for transporting articles in one direction through said chamber, means for passing heated air in the opposite direction through said chamber, mechanism for removing air from a plurality of portions of said chamber and for returning it at portions spaced from said removal portions in one direction relative to the direction of progress of the air through said chamber, mechanism for removing air from other portions of said chamber and returning it at other portions spaced therefrom in an opposite direction relative to the direction of progress of the air through said chamber, and means for heating the air between its removal and introduction by one of said mechanisms.

10. An apparatus of the class described, comprising a chamber, means for transporting articles in superposed tiers through said chamber in one direction, means for passing heated air through said chamber in the opposite direction, means for taking air from said chamber at any of a plurality of levels and returning said air at any of a plurality of levels in advance of its removal in the direction of travel of the air in said chamber, and means for withdrawing air from any of a plurality of levels, heating the air so withdrawn and introducing the air so heated at any of a plurality of levels back of its withdrawal in the direction of travel of the air in said chamber.

11. An apparatus of the class described, comprising a sweating chamber, a drying chamber, means for transporting articles through said sweating chamber and then through said drying chamber, means for passing heated air through said drying chamber in a direction opposite to the passage of articles therethrough and then into said sweating chamber, means for heating the air as it passes to said sweating chamber, and means for supplying moisture to the air so heated to maintain it at a desired degree of humidity.

12. An apparatus of the class described comprising a chamber, means for transporting articles in one direction through said chamber, means for passing heated air through said chamber in the opposite direction, means for withdrawing air from said chamber at a plurality of positions therealong and for returning said air at other positions therealong, some of said returning positions being more advanced and some of said returning positions being less advanced in the direction of progress of the air through said chamber than the corresponding withdrawal positions, whereby some of said air so withdrawn flows in the same direction as the air in said chamber before being returned thereto, and some of said air so withdrawn flows in the opposite direction before being returned thereto, and means for heating the air withdrawn which flows in the same direction as the air in said chamber before being returned to said chamber.

In testimony whereof we have affixed our signatures.

ORTON B. BROWN.
HOWARD PARKER.